Oct. 20, 1959 — F. DE BUIGNE — 2,909,265
SHUTTLE MECHANISM
Filed Oct. 14, 1957 — 5 Sheets-Sheet 2
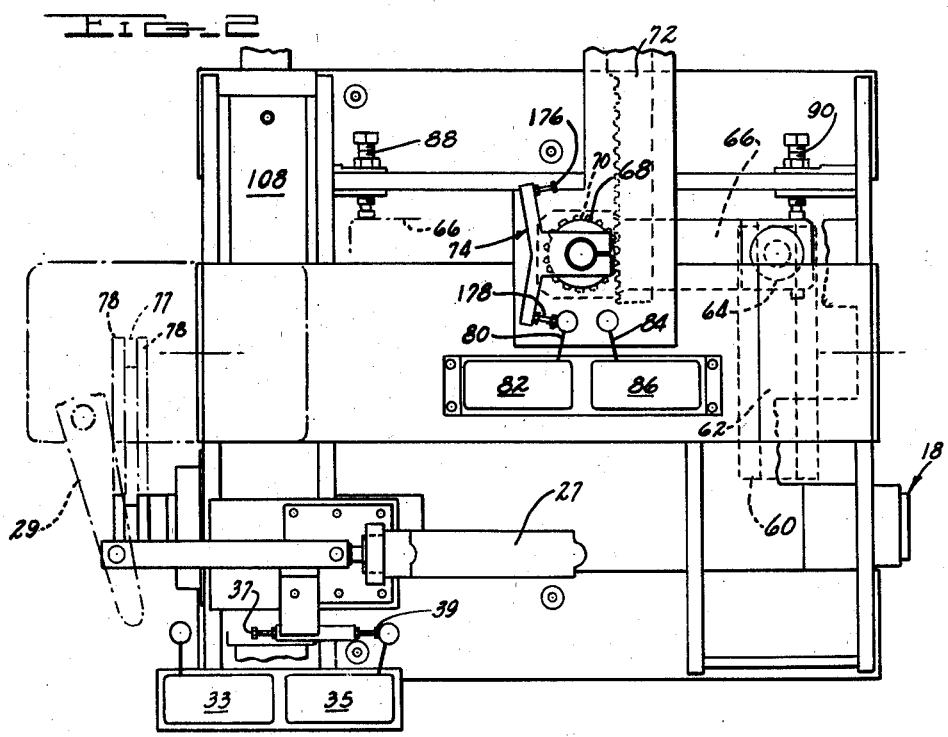
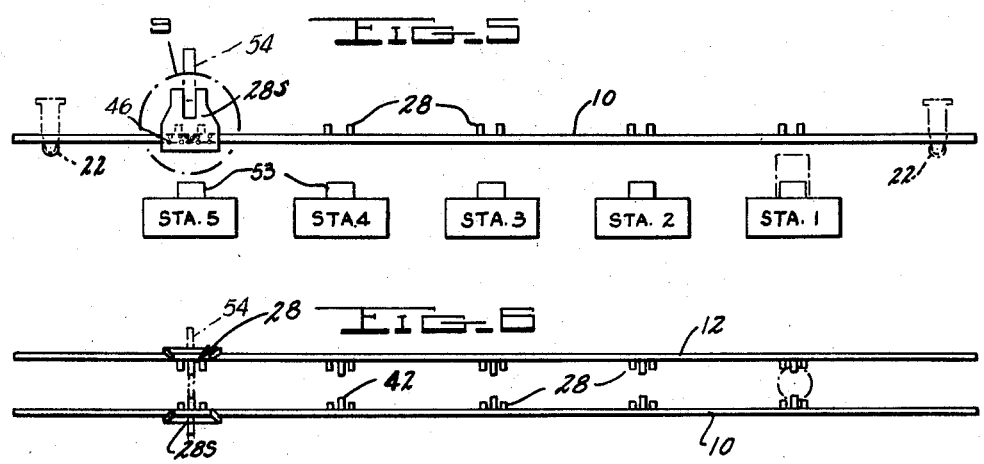
INVENTOR
FRANK DE BUIGNE
KOTTS & SHERIDAN
ATTORNEYS

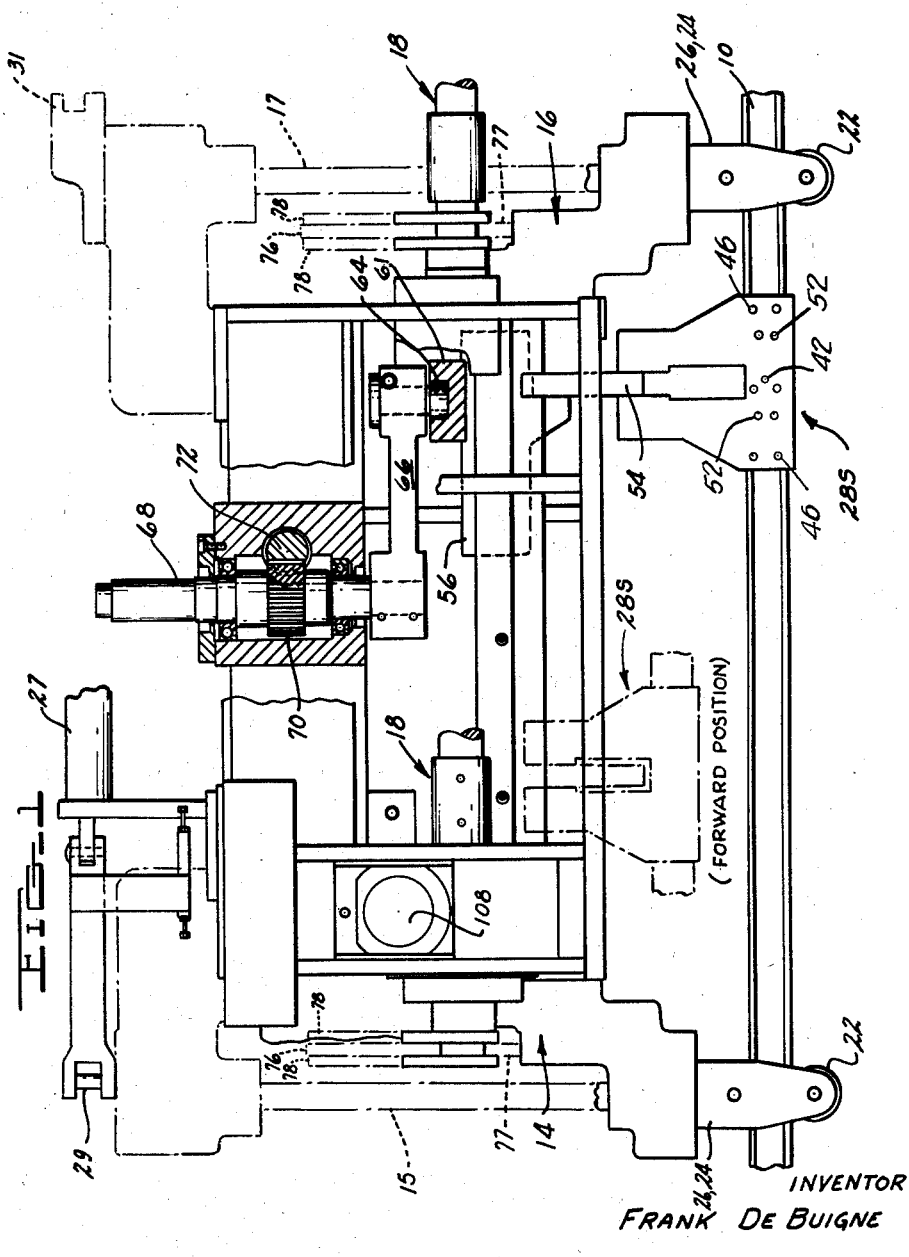

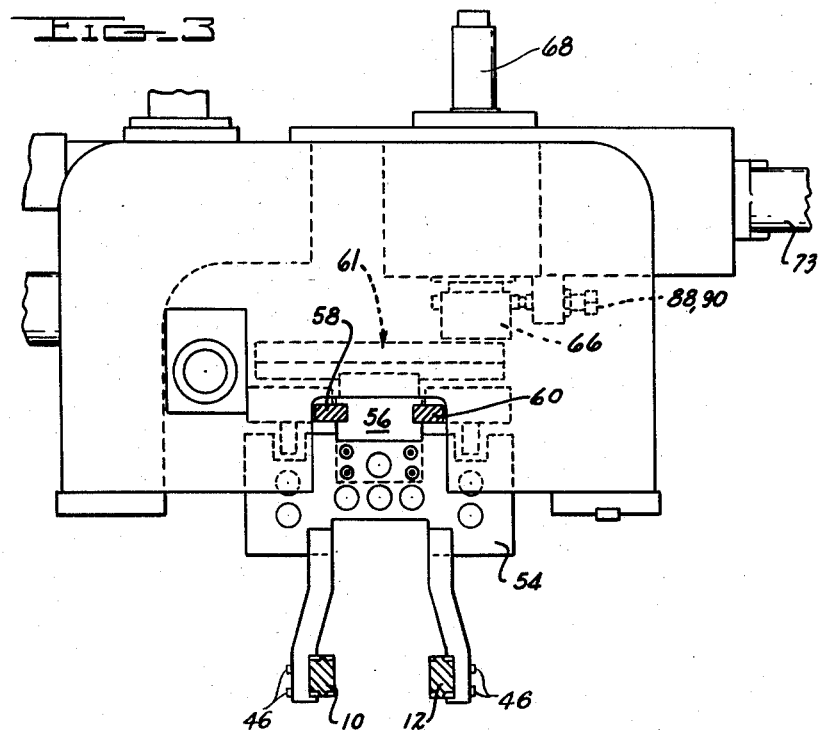
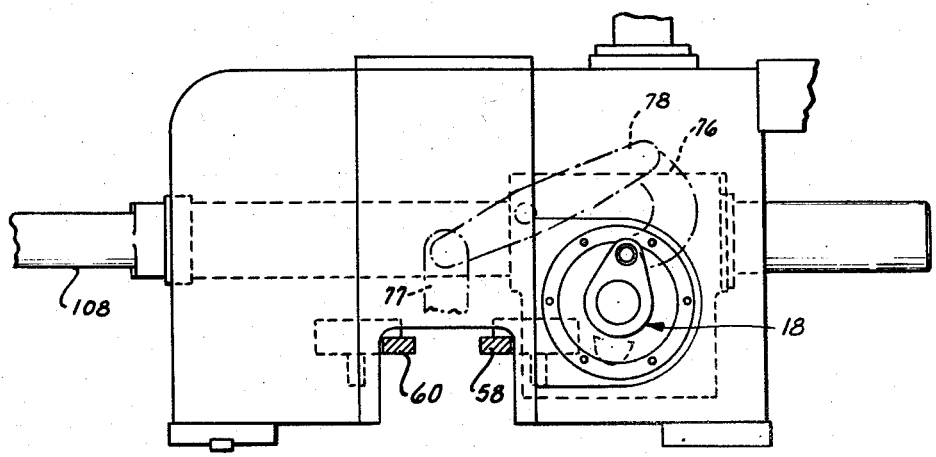

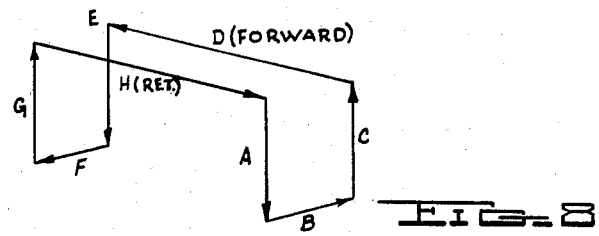
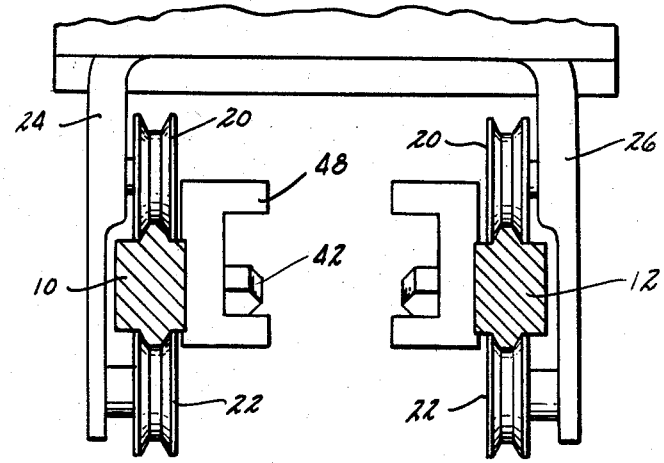
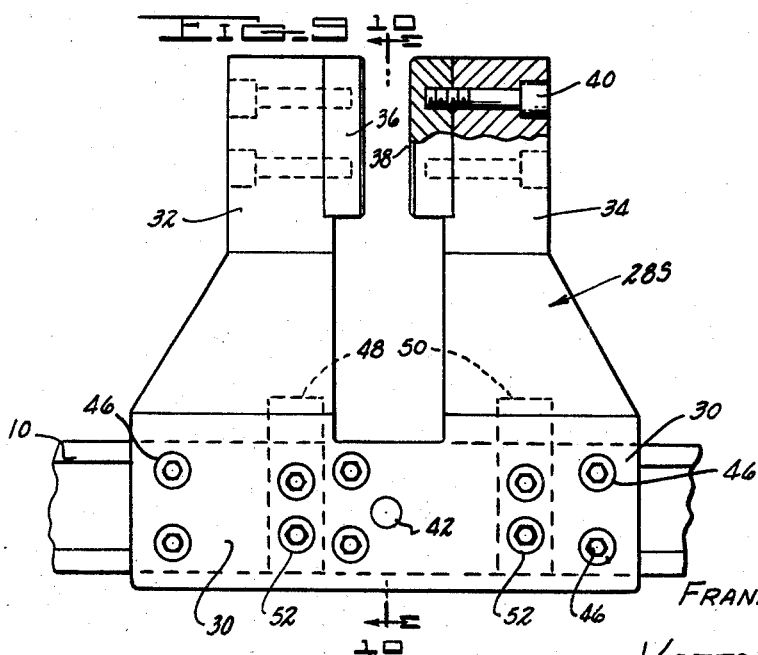

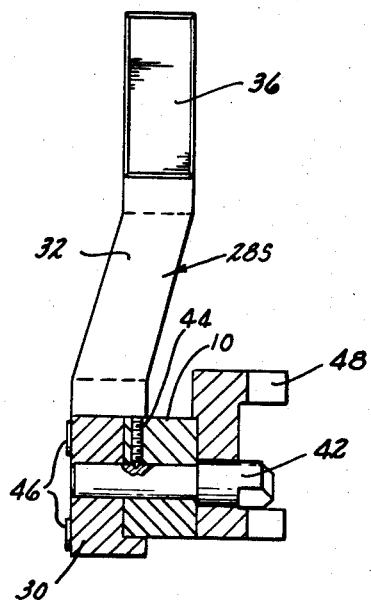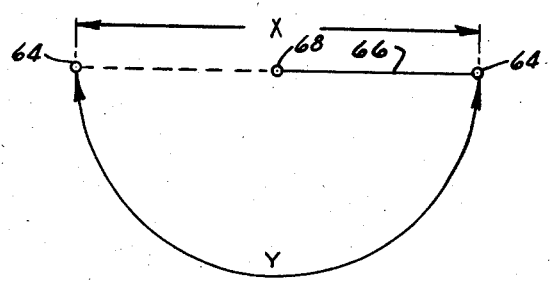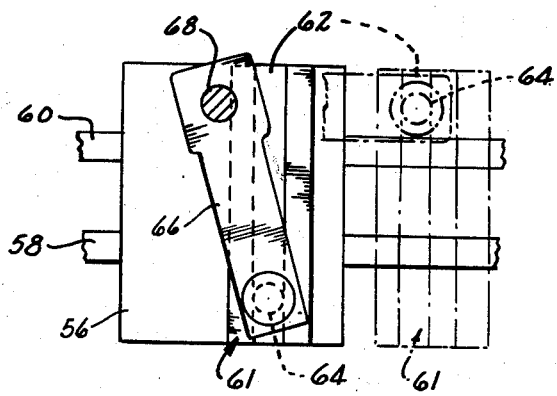

United States Patent Office 2,909,265
Patented Oct. 20, 1959

2,909,265

SHUTTLE MECHANISM

Frank De Buigne, Birmingham, Mich., assignor to La Salle Tool Company, Detroit, Mich.

Application October 14, 1957, Serial No. 689,793

7 Claims. (Cl. 198—19)

The present invention relates to improvements in an automatic material handling or shuttle mechanism for transferring parts from one location to another. Such a device for moving a piston through a succession of work stations is shown and described in my Patent No. 2,818,963, dated January 7, 1958. The shuttle mechanism is referred to generally therein at B.

In this type of shuttle mechanism, a pair of spaced substantially parallel shuttle bars are used. These bars have suitable gripping means positioned along their length so that several work pieces can be handled at one time. It is desired that the shuttle bars move precisely, and that the direction of movement of both bars be aligned and coordinated.

It is an object of the present invention to provide an improved shuttle mechanism wherein any movement of the shuttle bars is kept in alignment.

It is a further object of the present invention to provide a simple and effective guiding means for shuttle bars whereby relative movement of the shuttle bars is maintained under precise aligned directional control.

It is another object of the present invention to provide improved actuating means for moving the shuttle bars forward and back.

It is another object of the present invention to provide a shuttle mechanism for handling parts, which mechanism is simple and efficient in operation.

Other objects of this invention will appear in the following description and appended claims, reference being had to the accompanying drawings forming a part of this specification wherein like reference characters designate corresponding parts in the several views.

In the drawings:

Fig. 1 is a side elevation partially broken away to illustrate the present invention.

Fig. 2 is a top plan of Fig. 1.

Fig. 3 is an end elevational view looking from right to left.

Fig. 4 is an end elevational view in the opposite direction.

Fig. 5 is a partial elevational view of the shuttle bars.

Fig. 6 is a top plan of Fig. 5.

Fig. 7 is a motion diagram of the shuttle bar action.

Fig. 8 is a view showing the shuttle bar guide mechanism.

Fig. 9 is an enlarged view of the circled portion indicated at 9 in Fig. 5.

Fig. 10 is a sectional view taken on line 10—10 of Fig. 9.

Fig. 11 is a partial plan view of the motion transmitting arm and cross track shuttle advancing mechanism.

Fig. 12 is a diagrammatic view of the shuttle bar motion transmitting arm.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, Figs. 5 and 6 disclose a side elevation and top view respectively of a pair of shuttle bars 10 and 12 adapted to move several pistons successively along to the designated work stations. The general scheme of movement of the shuttle bars is demonstrated in Fig. 7 of the drawings wherein:

A. The bars are moved down adjacent the work pieces on the work platforms.
B. The bars are moved toward each other to clamp the work pieces.
C. The bars are lifted to the raised position.
D. The bars are moved longitudinally forward.
E. The bars are lowered to the work platforms.
F. The bars are spread apart to release the work pieces.
G. The bars are lifted again to the raised position.
H. The bars are moved longitudinally backward and returned to the initial position.

The improved features to which the present application is directed are the means for moving the shuttle bars forward and back, and a guide means for making certain that both longitudinal shuttle bars always move in alignment.

Fig. 1 shows a portion of a shuttle mechanism for a piston handling machine similar to that disclosed in my previously identified patent. It is to be understood that the entire machine is not shown so that the points of novelty can be identified more readily. The portion shown comprises a pair of brackets 14 and 16 in vertical slidable engagement with the machine frame. A pair of rods 15 and 17 are rotatably engaged with said brackets and are vertically movable up and down by a torsion bar arrangement shown generally at 18. Each shuttle bar 10 and 12 is disposed between an upper roller 20 and a lower roller 22 journaled on the arms 24 and 26 which are slidably disposed on brackets 14 and 16 (Figs. 1 and 8).

The shuttle bars 10 and 12 are spread apart and closed by actuation of fluid cylinder 27 which is coupled with crank arm 29. Crank arm 29 is coupled with crank arm 31 (Fig. 1) through a longitudinal rod (not shown). Thus, movement of the piston in fluid cylinder 27 causes rotational movement of the crank arms 29 and 31 and any other crank arms which may be used. This rotational movement of the crank arms results in spreading or closing the shuttle bars as described in my prior application. Limit switches 33 and 35 provide an electrical interlock and are engaged by adjustable stops 37 and 39 to indicate when the motion of fluid cylinder 27 is completed.

As shown in Figs. 5 and 6, clamping means 28 are disposed along the length of the shuttle bars 10 and 12 to effect clamping of the work pieces when desired. It will be noted that one clamping member 28S is somewhat different than the others, and is part of a shuttle bar guide means. This clamping member is shown in particular detail in Figs. 9 and 10 of the drawings. It includes a base 30 having upright arms 32 and 34. A pair of bearing blocks 36 and 38 are affixed to the upright arms by cap screws such as shown at 40.

The wrist pin peg 42 is affixed to the shuttle bar 10 by means of the set screw 44. The base 30 of the member 28S is affixed to shuttle bar 10 by means of cap screws 46, and the piston body holders 48 and 50 are affixed to the shuttle bar 10 and clamp base 30 by cap screws 52. The wrist pin peg is adapted to fit within the wrist pin hole of a piston, and the piston body holders 48 and 50 are adapted to engage the piston body at its periphery. A similar arrangement exists with respect to shuttle bar 12.

It will not noted in Fig. 5 that each work station has an upright post 53 adapted to seat a piston in position at the station. It is important that the piston be lowered into position and raised away from position with accuracy. It is also important that the wrist pin pegs, such as shown at 42, move into and out of engagement with the wrist pin holes in the piston with precision.

The member 28S is adapted to work in cooperation with a guide plate 54, which is affixed to a movable forward and return head 56 (Figs. 1 and 3), to provide a guiding means for the shuttle bars 10 and 12. The shuttle bars are coupled with the head 56 for movement therewith through the members 28S and the guide plate 54. The movable head 56 is disposed on ways 58 and 60 (Fig. 3). A track member 61 is affixed atop the movable head 56 (Figs. 1 and 11). This track member includes a transverse groove 62. An end member such as roller 64 is disposed in the groove 62, and this roller is rotatably positioned on the free end of a pivotal arm 66. The other end of the arm 66 is affixed to a vertical shaft 68. The shaft 68 is positioned in the top of the machine frame as shown in Fig. 1. A pinion gear 70 is positioned intermediate the ends of shaft 68. This pinion gear meshes with a transversely shiftable gear rack 72. The gear rack 72 is actuated by a suitable fluid cylinder 73 (Fig. 3). Thus, when the fluid cylinder is actuated, the gear rack 72 will move transversely, and this will rotate the pinion 70 and the shaft 68 to which it is affixed. Rotation of the shaft 68 causes rotation of the pivotal arm 66.

As the pivotal arm 66 is rotated, the roller 64 engages the sidewall of the groove 62, and the movable head 56 is moved either back or forward, depending upon the direction of rotation of the pivotal arm 66. The movement of this mechanism is demonstrated in Fig. 12. The pivotal arm 66 moves through 180 degrees of rotation in either direction as indicated by the arrow Y. This rotary movement is translated into linear movement of head 56 through the distance X. Referring to Fig. 11, it will be seen that the movable head 56 and the pivotal arm 66 have been moved from the phantom position (which is the rearward position shown in Fig. 1) to a forward position farther to the left. The pivotal arm 66 has been rotated clockwise approximately 80 degrees, and this movement has been translated into forward linear movement of the head 56.

A yoke 74 is affixed to the upper end of shaft 68 (Fig. 2), and this yoke has adjustable contact bosses 176 and 178 thereon. Boss 178 contacts the finger 80 of limit switch 82 when the pivotal arm 66 is in the position shown in Fig. 2 to indicate the motion of the fluid cylinder 73 is complete. When the pivotal arm 66 rotates 180 degrees, the finger 84 of limit switch 86 is contacted by boss 176. Adjustable stops 88 and 90 are also provided to limit the rotational movement of pivotal arm 66.

Since guide plate 54 is affixed to the movable head 56, it also moves back or forward longitudinally as the head is moved by rotary movement of pivotal arm 66. The member 28S acts as a guide follower and engages the guide member or plate 54 constantly. Thus the member 28S moves with the head 56. The phantom position of the member 28S in Fig. 1 shows the left position of the same after the pivotal arm 66 has rotated through 180 degrees from its starting position. The member 28S is also shown in the raised position at this point. Raising of the member 28S and the accompanying shuttle bars 10 and 12 is accomplished through torsion rod 18. This mechanism is explained fully in my Patent No. 2,818,963 and it is not again explained in detail here. The torsion rod 18 is rotated by a fluid cylinder 108 through a rack and pinion arrangement, and this rotational movement of the torsion rod is transferred through links 76 and 78, which are in engagement with ears 77 on brackets 14 and 16 (Figs. 1 and 4), into vertical lifting and lowering movement of the shuttle bars and accompanying mechanism.

From the foregoing, it will be seen that an improved shuttle mechanism has been provided which includes a novel arrangement having the pivotal arm 66 and the movable head 56 for moving the shuttle bars forward and back. Since the movement Y (Fig. 12) is circular, the linear movement is fastest at the 90 degree position and slowest at both end positions. Thus, the linear movement of the shuttle bars decelerates toward both end positions and the shuttle bars do not halt abruptly. This reduces wear and provides longer life in the mechanism.

The member 28S being in constant engagement with plate 54, all movements of the shuttle bars are kept in alignment. The wrist pin pegs will precisely engage and disengage the wrist pin holes in the pistons. The pistons will be properly seated on and lifted from the seating posts at the work stations, and shuttling will be accomplished in a smooth and efficient manner.

Having thus described my invention, I claim:

1. In a device for shuttling a workpiece along a row of progressive work stations, including a pair of parallel shuttle bars having clamping means positioned thereon, the improvement which comprises actuating means for movement of said shuttle bars in a longitudinal direction; a guide plate intermediate said shuttle bars and said actuating means; a pair of transversely aligned, bifurcated shuttle bar guides, one disposed on each of the shuttle bars; each of said shuttle bar guides having bearing surfaces thereon to engage both surfaces of said guide plate.

2. In a device for shuttling a workpiece along a row of progressive work stations, including a pair of parallel shuttle bars having clamping means positioned thereon, the improvement which comprises actuating means for movement of said shuttle bars in a longitudinal direction; a movable arm on said actuating means; coupling means intermediate said actuating means and said shuttle bars; a transverse track on said coupling means; one end of said movable arm in engagement with said track on said coupling means; rotational movement of said arm causing longitudinal movement of said shuttle bars; and means for rotating said arm 180 degrees in two directions.

3. In a device for shuttling a workpiece along a row of progressive work stations, including a pair of parallel shuttle bars having clamping means positioned thereon, the improvement which comprises actuating means for movement of said shuttle bars in a longitudinal direction; a movable arm on said actuating means; a guide plate intermediate said shuttle bars and said actuating means; a pair of transversely aligned, bifurcated shuttle bar guides, one disposed on each of the shuttle bars; each of said shuttle bar guides having bearing surfaces thereon to engage both surfaces of said guide plate; coupling means intermediate said actuating means and said shuttle bars; a transverse track on said coupling means; one end of said movable arm in engagement with said track on said coupling means; rotational movement of said arm causing longitudinal movement of said shuttle bars; and means for rotating said arm 180 degrees in two directions.

4. In a device for shuttling a workpiece along a row of progressive work stations, including a pair of parallel shuttle bars having clamping means positioned thereon, the improvement which comprises actuating means for movement of said shuttle bars in a longitudinal direction; a guide plate intermediate said shuttle bars and said actuating means; a pair of transversely aligned, bifurcated shuttle bar guides, one disposed on each of the shuttle bars; each of said shuttle bar guides having replaceable bearing surfaces thereon to engage both surfaces of said guide plate.

5. In a device for shuttling a workpiece along a row of progressive work stations, including a pair of parallel shuttle bars having clamping means positioned thereon, the improvement which comprises actuating means for movement of said shuttle bars in a longitudinal direction; a guide member affixed to said actuating means; a guide follower slideably engaged with said guide plate; movement of said actuating means moving said guide member and said follower in uniform relationship.

6. In a device for shuttling a workpiece along a row of progressive work stations, including a pair of parallel shuttle bars having clamping means positioned thereon, the improvement which comprises actuating means for movement of said shuttle bars in a longitudinal direction; a movable arm on said actuating means; a guide member affixed to said actuating means; a guide follower slideably engaged with said guide plate; rotational movement of said arm causing longitudinal movement of said shuttle bars; and means for rotating said arm 180 degrees in two directions.

7. In a device for shuttling a workpiece along a row of progressive work stations, which includes a pair of parallel shuttle bars having clamping means thereon, and wherein the shuttle bars are disposed in longitudinally sliding engagement on supports which supports are movable vertically to raise and lower the shuttle bars and are spreadable transversely to move the shuttle bars to and from a clamping position, the improvement which comprises a longitudinally movable head; a guide plate affixed to said movable head; a pair of transversely aligned, bifurcated shuttle bar guides, one disposed on each of the shuttle bars; each of said shuttle bar guides having replaceable bearing surfaces which engage both sides of said guide plate; movement of said head causing longitudinal movement of said shuttle bars.

References Cited in the file of this patent

UNITED STATES PATENTS

| | | |
|---|---|---|
| 2,395,146 | Ray | Feb. 19, 1946 |
| 2,818,963 | DeBuigne | Jan. 7, 1958 |